United States Patent
Zhuo et al.

(10) Patent No.: US 11,127,954 B2
(45) Date of Patent: Sep. 21, 2021

(54) CATHODE MATERIAL FOR A SODIUM-ION BATTERY, PREPARATION METHOD THEREFOR AND APPLICATION THEREOF

(71) Applicant: SHENZHEN UNIVERSITY, Shenzhen (CN)

(72) Inventors: Haitao Zhuo, Shenzhen (CN); Shaojun Chen, Shenzhen (CN); Yuxin Chen, Shenzhen (CN)

(73) Assignee: Shenzhen University, Shenzhen (CN)

(*) Notice: Subject to any disclaimer, the term of this patent is extended or adjusted under 35 U.S.C. 154(b) by 0 days.

(21) Appl. No.: 17/260,929

(22) PCT Filed: May 14, 2019

(86) PCT No.: PCT/CN2019/086771
§ 371 (c)(1),
(2) Date: Jan. 15, 2021

(87) PCT Pub. No.: WO2020/215395
PCT Pub. Date: Oct. 29, 2020

(65) Prior Publication Data
US 2021/0151767 A1 May 20, 2021

(30) Foreign Application Priority Data
Apr. 23, 2019 (CN) .......................... 201910327175.6

(51) Int. Cl.
*H01B 1/08* (2006.01)
*H01M 4/58* (2010.01)
(Continued)

(52) U.S. Cl.
CPC ............. *H01M 4/625* (2013.01); *C01B 25/45* (2013.01); *H01B 1/08* (2013.01); *H01M 4/366* (2013.01);
(Continued)

(58) Field of Classification Search
CPC .. H01B 1/00; H01B 1/08; H01M 4/36; H01M 4/58; H01M 4/62
See application file for complete search history.

(56) References Cited

U.S. PATENT DOCUMENTS

2015/0125749 A1* 5/2015 Tang .................. H01M 4/0471
429/220

FOREIGN PATENT DOCUMENTS

| CN | 103923275 | * | 7/2014 |
| CN | 105914352 | * | 8/2016 |
| CN | 107845796 | * | 3/2018 |

OTHER PUBLICATIONS

English language translation of PCT/ISA/210 (mailed Feb. 12, 2020).*

(Continued)

*Primary Examiner* — Mark Kopec
(74) *Attorney, Agent, or Firm* — Dinsmore & Shohl LLP

(57) ABSTRACT

Provided by the present invention is a cathode material for a sodium-ion battery with a coating structure and a preparation method therefor. In the present invention, an Na3V2 (PO4)3/C cathode material is prepared by means of a sol-gel method. Synthesized zwitterionic polymers may be used as chelating agents and as a carbon source; the process is simple, can quickly form a gel, and the reaction time is shortened contains a zwitterionic structure which may be well dissolved with the precursor of sodium vanadium phosphate to form a stable carbon coating layer. Compared to the prior art, the cathode material for a sodium-ion battery of the present invention enhances the electrical conductivity and cycle performance of the cathode material by means of the doping of nitrogen and sulfur on carbon. At the same time, the prepared cathode material for a sodium-ion battery (Continued)

has sodium vacancies and maintains a stable structure during the process of sodium-ion intercalation/deintercalation.

7 Claims, 3 Drawing Sheets

(51) Int. Cl.
*H01M 4/62* (2006.01)
*C01B 25/45* (2006.01)
*H01M 4/36* (2006.01)
*H01M 10/054* (2010.01)
*H01M 4/02* (2006.01)

(52) U.S. Cl.
CPC ....... *H01M 4/5825* (2013.01); *H01M 10/054* (2013.01); *C01P 2002/74* (2013.01); *C01P 2004/03* (2013.01); *C01P 2004/80* (2013.01); *C01P 2006/40* (2013.01); *H01M 2004/028* (2013.01)

(56) References Cited

OTHER PUBLICATIONS

Hao et al "Hydrothernal-sol-gel synthesis of Na3V2(PO4)3/C cathode material and its electrochemical performances", Journal of Functional Materials, 2018, 49(11): 11001-11004.*

* cited by examiner

CATHODE MATERIAL FOR A SODIUM-ION BATTERY, PREPARATION METHOD THEREFOR AND APPLICATION THEREOF

CROSS REFERENCE TO RELATED APPLICATION

The present application is a National Phase Entry of International Application No. PCT/CN2019/086771, entitled "SODIUM ION BATTERY POSITIVE ELECTRODE MATERIAL, PREPARATION METHOD THEREFOR AND APPLICATION THEREOF" and filed on May 14, 2019 and claims priority to Chinese Application No. 201910327175.6, filed Apr. 23, 2019, each of which is incorporated by reference herein in its entirety.

TECHNICAL FIELD

The present invention belongs to the technical field of energy materials, and in particular relates to a cathode material for a sodium-ion battery, a preparation method and an application thereof.

BACKGROUND

The cathode material for a sodium-ion battery, sodium vanadium phosphate ($Na_3V_2(PO_4)_3$), is a fast ion conductor having relatively high ionic conductivity, excellent thermal stability, large channels that allow sodium ions to pass through quickly, stable structure, high working voltage, high capacity and other advantages, it is considered to be the most promising cathode material for a sodium-ion battery. However, due to its disadvantages such as relatively low electrical conductivity, large electrochemical polarization and poor cycle performance, its actual electrochemical performance is poor and it is difficult to reach industrialization.

For the sodium-inserted cathode material, cathode material for a battery with NASICON (sodium super-ion conductor) structure has attracted extensive attention due to its advantages of three opens frame structure, high charge and discharge voltage, large energy storage capacity, rapid charge and discharge capability, and good cycle stability.

Currently, most researchers improve the electrochemical performance of $Na_3V_2(PO_4)_3$ by nanometering, coating conductive materials, and metal ion doping. Wherein, carbon coating is considered to be a very effective way to improve the electrochemical performance of $Na_3V_2(PO_4)_3$. However, cathode materials for a sodium-ion battery of carbon-coated $Na_3V_2(PO_4)_3$ still have a big space for development, and the conductivity and coating effect of the carbon coating layer need to be further improved.

SUMMARY

Technical Problem

The purpose of the present invention is to provide a cathode material for a sodium-ion battery and a preparation method thereof, so as to solve the technical problem of insufficient electrical conductivity and cycle performance of the existing cathode material for a sodium-ion battery. (See amended claims)

Technical Solution

In one aspect, the present invention provides a method for preparing a cathode material for a sodium-ion battery, comprising the following steps:

adding an initiator to a system of methyl allyl polyoxyethylene ether, N,N-dimethyl (methacryloxyethyl) ammonium propanesulfonate and acrylic acid, heating and reacting to obtain a solution of zwitterionic polymer;

mixing the solution of zwitterionic polymer and a aqueous solution of sodium vanadium phosphate, and performing a drying process to obtain a precursor of the cathode material for the sodium-ion battery;

sintering the precursor of the cathode material for the sodium-ion battery to obtain the cathode material for the sodium-ion battery.

Preferably, a method for preparing the aqueous solution of sodium vanadium phosphate comprises the following steps:

preparing ammonium metavanadate, oxalic acid, ammonium dihydrogen phosphate and sodium acetate according to the molar ratio of sodium, vanadium and phosphorus at [2~1]:[1~3]:[4~2], wherein the mass ratio of oxalic acid to ammonium metavanadate is [2~1]:[2~1].

Preferably, the initiator is any one of ammonium persulfate, potassium persulfate and hydrogen peroxide-ferrous sulfate.

Preferably, methyl allyl polyoxyethylene ether, N,N-dimethyl (methacryloxyethyl) ammonium propanesulfonate and acrylic acid are in a mass ratio of 10-90:10-30:10-30.

Preferably, the initiator has a mass fraction of 0.5%-1%.

Preferably, the mass ratio of the zwitterionic polymer to sodium vanadium phosphate is 1-20:80-99.

Preferably, the sintering treatment comprises the following steps: Performing an initial sintering at a temperature of 300° C. to 400° C. for 5 h, then performing a second sintering at a temperature of 700° C. to 800° C. for 8 h, and the heating rate of the sintering is 3° C./min.

Technical Effect

In another aspect, the present invention provides a cathode material for a sodium-ion battery prepared by said preparation method.

In another aspect, the present invention provides a positive electrode for a sodium-ion battery comprising said cathode material for a sodium-ion battery.

In yet another aspect, the present invention provides a sodium-ion battery comprising said cathode material for a sodium-ion battery.

Compared to the prior art, the method for preparing a cathode material for a sodium-ion battery of the present invention prepares sulfur-nitrogen doped carbon cathode materials by means of the sol-gel method. Synthesized zwitterionic polymer can be used as a chelating agent and as a carbon source; the process is simple, can quickly form a gel, and the reaction time is shortened, contains a zwitterionic structure which can be well dissolved with the precursor of sodium vanadium phosphate to form a more stable sulfur-nitrogen doped carbon cathode material.

The cathode material for a sodium-ion battery of the present invention enhances the electrical conductivity and cycle performance of the cathode material by means of the doping of nitrogen and sulfur on carbon. At the same time, the prepared cathode material for a sodium-ion battery has sodium vacancies and maintains a stable structure during the process of sodium-ion intercalation/deintercalation.

The positive electrode for a sodium-ion battery of the present invention is prepared by using said cathode material for a sodium-ion battery, so it has good electrical conductivity and cycle performance.

The sodium-ion battery of the present invention is prepared by using the cathode material for a sodium-ion battery, so it has good electrical conductivity and cycle performance, and also has better stability.

DETAILED DESCRIPTION

Figure 1:
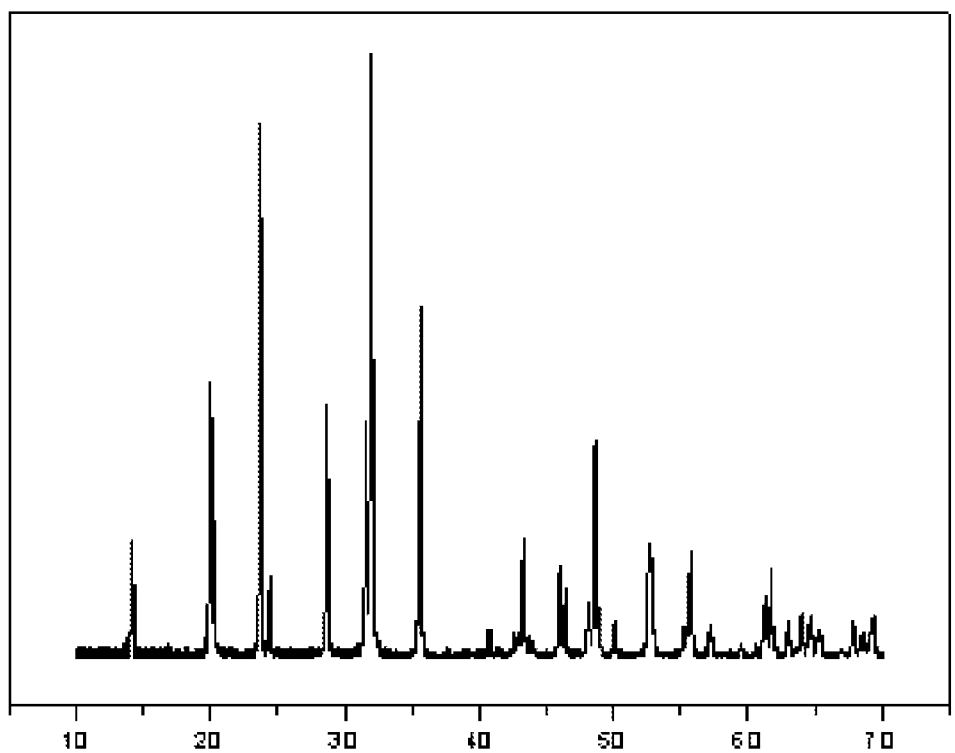
FIG. 1 is an X-ray diffraction pattern of $Na_3V_2(PO_4)_3$/C material in Example 1 of the present invention.

To describe the technical problems, technical solutions, and beneficial effects of the present invention more clearly, the following further detail description will be given accompanying with the embodiments. It should be understood that the specific embodiments described below are only used to explain the present invention, but not to limit the present invention.

In one aspect, the embodiment of the present invention provides a method for preparing a cathode material for a sodium-ion battery, comprising the following steps:

S01: Adding an initiator to a system of methyl allyl polyoxyethylene ether, N,N-dimethyl (methacryloxyethyl) ammonium propanesulfonate and acrylic acid, heating and reacting to obtain a solution of zwitterionic polymer;

S02: Mixing the solution of zwitterionic polymer and a aqueous solution of sodium vanadium phosphate, and performing a drying process to obtain a precursor of the cathode material for the sodium-ion battery;

S03: Sintering the precursor of the cathode material for the sodium-ion battery to obtain the cathode material for the sodium-ion battery.

In the above step S01, methyl allyl polyoxyethylene ether, N,N-dimethyl (methacryloxyethyl) ammonium propanesulfonate and acrylic acid are in a mass ratio of 10-90:10-30:10-30. A proper ratio can change the particle size of the emulsion polymerization, which has a more important impact on the formation of the coating layer. Selecting a smaller particle size in this range can make the coating layer more uniform and dense.

In the above step S01, the initiator is any one of ammonium persulfate, potassium persulfate and hydrogen peroxide-ferrous sulfate. Ammonium persulfate, potassium persulfate and hydrogen peroxide-ferrous sulfate are used as initiators for the emulsion polymerization of vinyl monomers such as vinyl acetate and acrylate. They are cheap, and the resulting emulsion has better water resistance. More preferably, the initiator is Ammonium persulfate, which has good effect and low price, and the elements contained in the initiator are sulfur and nitrogen and will not introduce other miscellaneous elements to affect the performance.

In the above step S01, the initiator has a mass fraction of 0.5%-1%.

In the above step S02, a method for preparing the aqueous solution of sodium vanadium phosphate comprises the following steps:

preparing ammonium metavanadate, oxalic acid, ammonium dihydrogen phosphate and sodium acetate according to the molar ratio of sodium, vanadium and phosphorus at [2~1]:[1~3]:[4~2], wherein the mass ratio of oxalic acid to ammonium metavanadate is [2~1]:[2~1].

In the above step S02, the mass ratio of the zwitterionic polymer to sodium vanadium phosphate is 1-20:80-99. This ratio can ensure that the coating layer can completely cover the core body without affecting the electrical performance due to excessive amount.

In the above step S03, the sintering treatment comprises the following steps: Performing an initial sintering at a temperature of 300° C. to 400° C. for 5 h, then performing a second sintering at a temperature of 700° C. to 800° C. for 8 h, and the heating rate of the sintering is 3° C./min. Sintering for two times can remove unnecessary impurities in batches. If removed at one time, the different properties of the impurities will cause uneven texture of the coating layer.

In another aspect, the embodiment of the present invention provides a cathode material for a sodium-ion battery with a coating structure by adopting said method for preparing the cathode material for a sodium-ion battery. The cathode material is sintered from nitrogen source, sulfur source, carbon source and sodium vanadium phosphate. The cathode material is doped with nitrogen and sulfur elements on the basis of the original carbon-coated doped ion battery. After sintering, the carbon element becomes zero-valence carbon black, so the electrical conductivity is very weak, while the doped nitrogen and sulfur elements will form compounds with different valences, thus changing the conductivity. Since the doped structure formed after combination is denser, its stability and cycle performance are enhanced.

In another aspect, the embodiment of the present invention provides a positive electrode for a sodium-ion battery comprising said cathode material for a sodium-ion battery. Because the positive electrode for battery according to the embodiment of the present invention adopts said cathode material, both the cycle performance and electrical conductivity are improved.

In yet another aspect, the embodiment of the present invention provides a sodium-ion battery comprising said cathode material for a sodium-ion battery. Because the battery according to the embodiment of the present invention adopts said cathode material, the cycle performance is improved, and the product stability is also improved.

1. Embodiments of Cathode Materials for Sodium-Ion Batteries and Preparation Methods Thereof Example 11

This Example provides a cathode material for a sodium-ion battery and a preparation method thereof. The method for preparing the cathode material for a sodium-ion battery comprises the following steps:

In the first step, water was used as a solvent, 4.6 g of ammonium metavanadate and 4.6 g of oxalic acid were dissolved therein, and stirred evenly with a magnetic force, then 6.9 g of ammonium dihydrogen phosphate and 4.9 g of sodium acetate were added, and stirred to obtain a dark green solution, a precursor solution of sodium vanadium phosphate was prepared.

In the second step, water was used as solvent, 10 parts of methyl allyl polyoxyethylene ether (TPEG) and 80 parts of N,N-dimethyl (methacryloxyethyl) ammonium propanesulfonate (DMAPS) were added into a three-neck flask and stirred evenly; then 10 parts of acrylic acid (AA) was added, continued to stir, and deionized water was added to adjust the concentration of the solution, meanwhile heated to a temperature of 70° C.; and an aqueous solution having a mass fraction of 10% ammonium persulfate ($NH_4S_2O_8$) was prepared by using 1 wt % initiator ammonium persulfate ($NH_4S_2O_8$), and slowly dropped into a reactor, after reacting for 4 h, a white gel having high molecular weight was obtained.

In the third step, a mucus, i.e. the white gel was dried into a film, and 20 wt % of the film was added into a precursor solution of sodium vanadium phosphate, stirred and heated, and finally formed a gel. The gel was dried in a vacuum oven, in an argon atmosphere, performed an initial sintering to a temperature of 300° C. for 5 h, then grinded and performed a second sintering at a temperature of 700° C. for 8 h, wherein, the heating rate of both the initial sintering and the second sintering was 3° C./min, finally sodium vanadium phosphate/cathode material for a carbon-sodium-ion battery was obtained. The cathode material of the sodium vanadium phosphate/carbon sodium ion battery was tested by TG, and its carbon content was less than 5%.

The X-ray diffraction pattern of $Na_3V_2(PO_4)_3$/C material prepared in this embodiment of the present invention was shown in FIG. 1. It can be seen from FIG. 1, there were no extra peaks, and all diffraction peaks can be well matched with the R-3c space group, indicating that the sample prepared at said temperature described in the present invention had high crystallinity.

Example 12

In the first step, water was used as a solvent, 6 g of ammonium metavanadate and 6 g of oxalic acid were dissolved therein, and stirred evenly with a magnetic force, then 9 g of ammonium dihydrogen phosphate and 9 g of sodium acetate were added, and stirred to obtain a dark green solution, from which a precursor of sodium vanadium phosphatewas obtained.

In the second step, water was used as solvent, 20 parts of methyl allyl polyoxyethylene ether (TPEG) and 60 parts of N,N-dimethyl (methacryloxyethyl) ammonium propane-sulfonate (DMAPS) were added into a three-neck flask and stirred evenly; then 20 parts of acrylic acid (AA) was added, continued to stir, and deionized water was added to adjust the concentration of the solution, meanwhile heated to a temperature of 90° C.; and an aqueous solution having a mass fraction of 10% ammonium persulfate (NH4S2O8) was prepared by using 1 part of initiator ammonium persulfate (NH4S2O8), and slowly dropped into a reactor, after reacting for 5 h, a white gel having high molecular weight was obtained.

In the third step, a mucus was dried into a film, and 30 wt % of the film was added into a precursor solution of sodium vanadium phosphate, stirred and heated, and finally formed a gel. The gel was dried in a vacuum oven, in an argon atmosphere, performed an initial sintering at a temperature of 400° C. for 5 h, then grinded and performed a second sintering at a temperature of 800° C. for 8 h, wherein, the heating rate of both the initial sintering and the second sintering was 3° C./min, finally sodium vanadium phosphate/cathode material for a carbon-sodium-ion battery was obtained. The positive electrode material of the sodium vanadium phosphate/carbon sodium ion battery was tested by TG, and its carbon content was less than 5 wt %.

Figure 3:
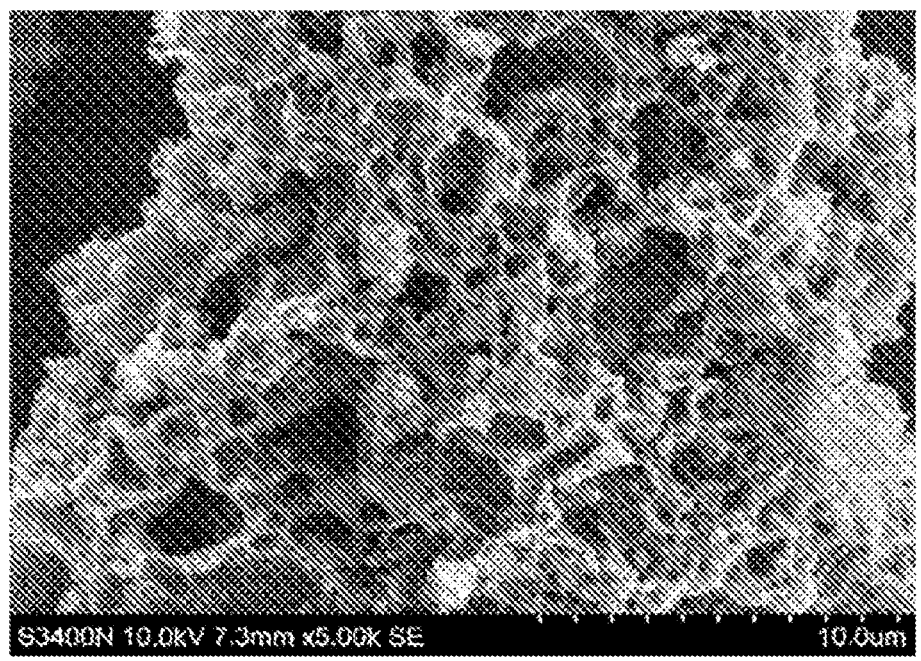
FIG. 3 is an SEM photo of $Na_3V_2(PO_4)_3$/C material in Example 2 of the present invention.

The SEM photo of $Na_3V_2(PO_4)_3$/C material prepared in this Example of the present invention was shown in FIG. 3. It can be seen from FIG. 3 that the sample was uniform granular and the particle surface had a porous structure. This was mainly because the zwitterionic polymer can quickly form a gel and form a porous structure on the surface of the material during the water evaporation process.

Example 13

This Example provides a cathode material for a sodium-ion battery and a preparation method thereof. The method for preparing cathode material for a sodium-ion battery comprises the following steps:

In the first step, water was used as a solvent, 5.0 g of ammonium metavanadate and 5.0 g of oxalic acid were dissolved therein, and stirred evenly with a magnetic force, then 6.0 g of ammonium dihydrogen phosphate and 6.0 g of sodium acetate were added, and stirred to obtain a dark green solution, and a precursor of sodium vanadium phosphate was prepared.

In the second step, water was used as solvent, 30 parts of methyl allyl polyoxyethylene ether (TPEG) and 40 parts of N,N-dimethyl (methacryloxyethyl) ammonium propane-sulfonate (DMAPS) were added into a three-neck flask and stirred evenly; then 30 parts of acrylic acid (AA) was added, continued to stir, and deionized water was added to adjust the concentration of the solution, meanwhile heated to a temperature of 80° C.; and an aqueous solution having a mass fraction of 10% ammonium persulfate ($NH_4S_2O_8$) was prepared by using 1 part of initiator ammonium persulfate ($NH_4S_2O_8$), and slowly dropped into a reactor, after reacting for 5 h, a white gel having high molecular weight is obtained.

In the third step, a mucus was dried into a film, and 25 wt % of the film was added into a precursor solution of sodium vanadium phosphate, stirred and heated, and finally formed a gel. The gel was dried in a vacuum oven, in an argon atmosphere, performed an initial sintering at a temperature of 350° C. for 5 h, then grinded and performed a second sintering at a temperature of 750° C. for 8 h, wherein, the heating rate of both the initial sintering and the second sintering was 3° C./min, finally sodium vanadium phosphate/cathode material for a carbon-sodium-ion battery was obtained. The positive electrode material of the sodium vanadium phosphate/carbon sodium ion battery was tested by TG, and its carbon content was less than 5 wt %.

2. Embodiments of Sodium-Ion Batteries

Example 21

The cathode material (active material) of sodium vanadium phosphate/carbon-sodium-ion battery obtained in Example 11, acetylene black, and a binder were grinded at a mass ratio of 8:1:1 into a slurry, coated on an aluminum sheet, dried, sliced, and installed in the battery. The first charge and discharge curve of the sodium-ion battery prepared by said cathode material of sodium vanadium phosphate/carbon-sodium-ion battery prepared in this embodiment was shown in FIG. 2. It can be seen from FIG. 2 that there was a voltage platform in the range of 2.8-4V, its value was about 3.4V. When the rate was 0.1 C, the initial charging capacity reached 110 mAh/g, which was close to the theoretical capacity of sodium vanadium phosphate.

Example 22

The cathode material (active material) of sodium vanadium phosphate/carbon-sodium-ion battery obtained in Example 12, acetylene black, and a binder are ground at a mass ratio of 8:1:1 into a slurry, which was coated on an aluminum sheet, dried, sliced, and installed in the battery. The first charge and discharge curve of the sodium-ion battery prepared by said cathode material of sodium vanadium phosphate/carbon-sodium-ion battery prepared in this Example was shown in FIG. 4. It can be seen from FIG. 4 that there was a voltage platform in the range of 2.8-4V, its value was about 3.4V. When the rate was 0.1 C, the initial charging capacity reached 110 mAh/g, which was close to the theoretical capacity of sodium vanadium phosphate.

Example 23

The cathode material (active material) of sodium vanadium phosphate/carbon-sodium-ion battery obtained in Example 13, acetylene black, and a binder are ground at a mass ratio of 8:1:1 into a slurry, which was coated on an aluminum sheet, dried, sliced, and installed in the battery. The first charge and discharge curve of the sodium-ion battery prepared by said cathode material of sodium vanadium phosphate/carbon-sodium-ion battery prepared in this Example was shown in FIG. 5. It can be seen from FIG. 5 that there was a voltage platform in the range of 2.8-4V, its value was about 3.4V. When the rate was 0.1 C, the initial charging capacity reached 110 mAh/g, which was close to the theoretical capacity of sodium vanadium phosphate.

Figure 6:
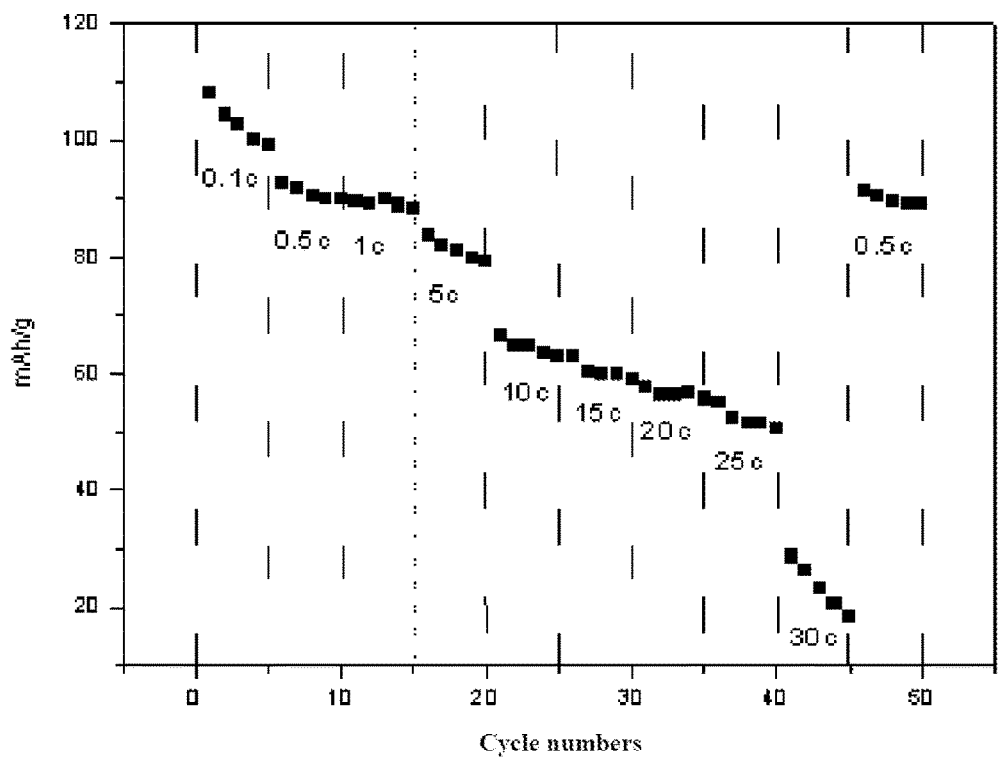
FIG. 6 is a graph of the test results of the rate performance of the sample in Example 3 of the present invention.

FIG. 6 was a rate performance graph of the sample in Example 1. It can be seen from the figure that the material showed excellent rate performance, and its capacity can reach 20-30 mAh/g at a high rate of 30 C.

Embodiment 3

Figure 2:
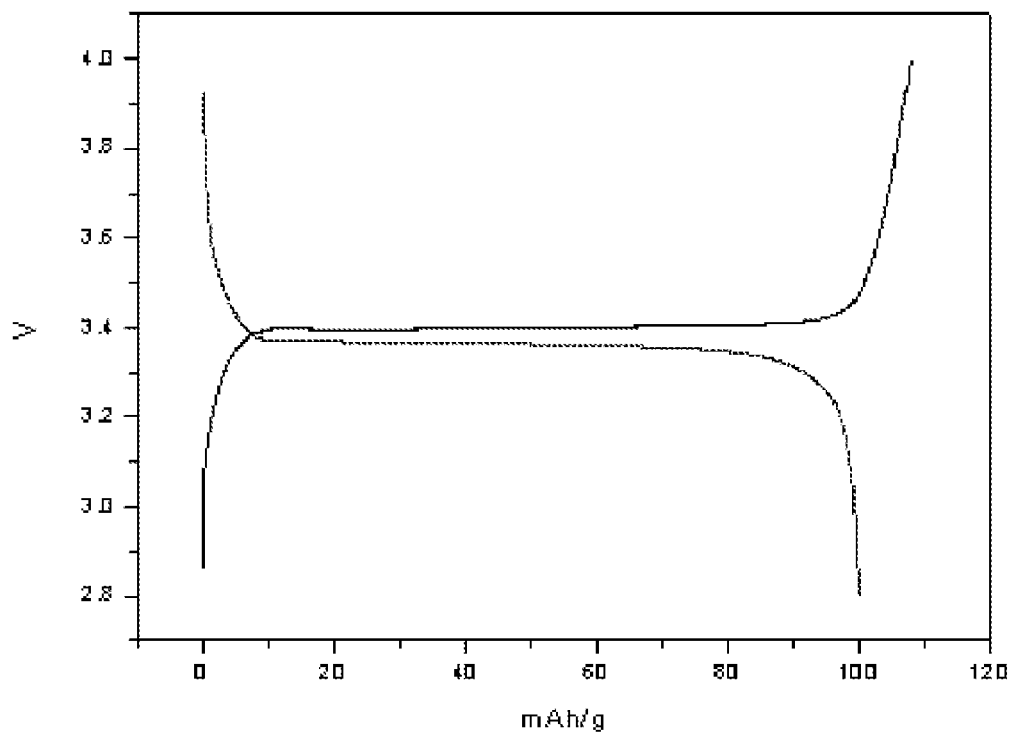
FIG. 2 is a graph of the first charge and discharge curve of the sample in Example 1 of the present invention.
Figure 5:
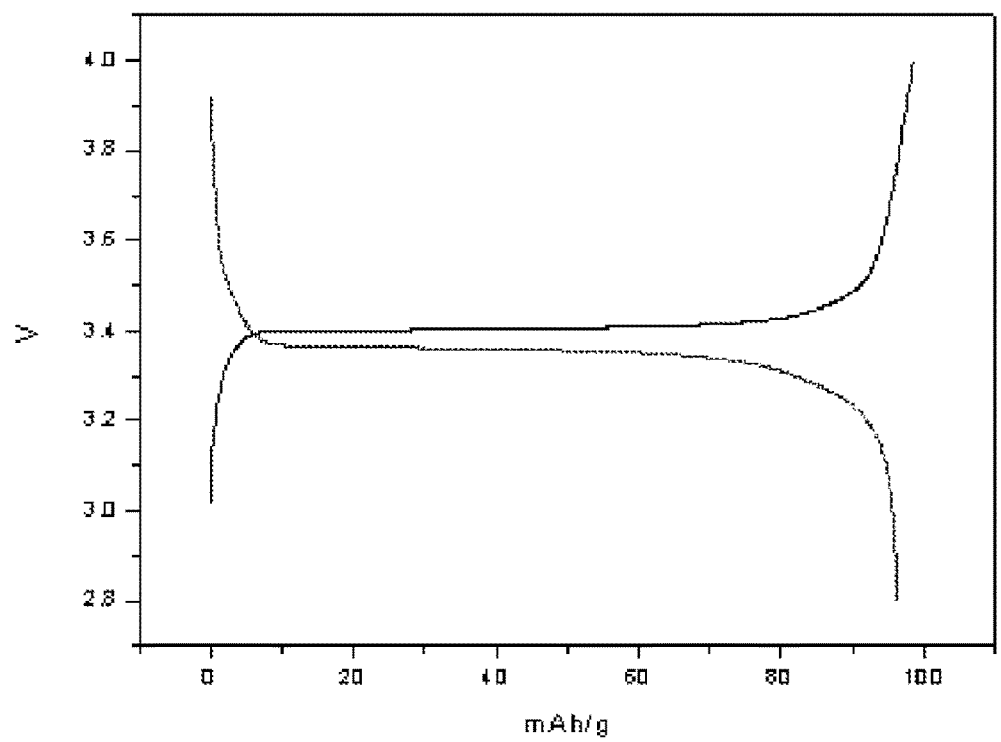
FIG. 5 is a graph of the first charge and discharge curve of the sample in Example 3 of the present invention.

The sodium-ion batteries in each Example were tested for charge-discharge performance, and the results are shown in FIGS. 2, 3 and 5.

The first charge and discharge curve of the sodium-ion battery (embodiment 21) comprising the cathode material for a sodium-ion battery of embodiment 11 was shown in FIG. 2. It can be seen from FIG. 2 that there was a voltage platform in the range of 2.8-4V, its value was about 3.4V. When the rate was 0.1 C, the initial charging capacity reached 110 mAh/g, which was close to the theoretical capacity of sodium vanadium phosphate.

Figure 4:
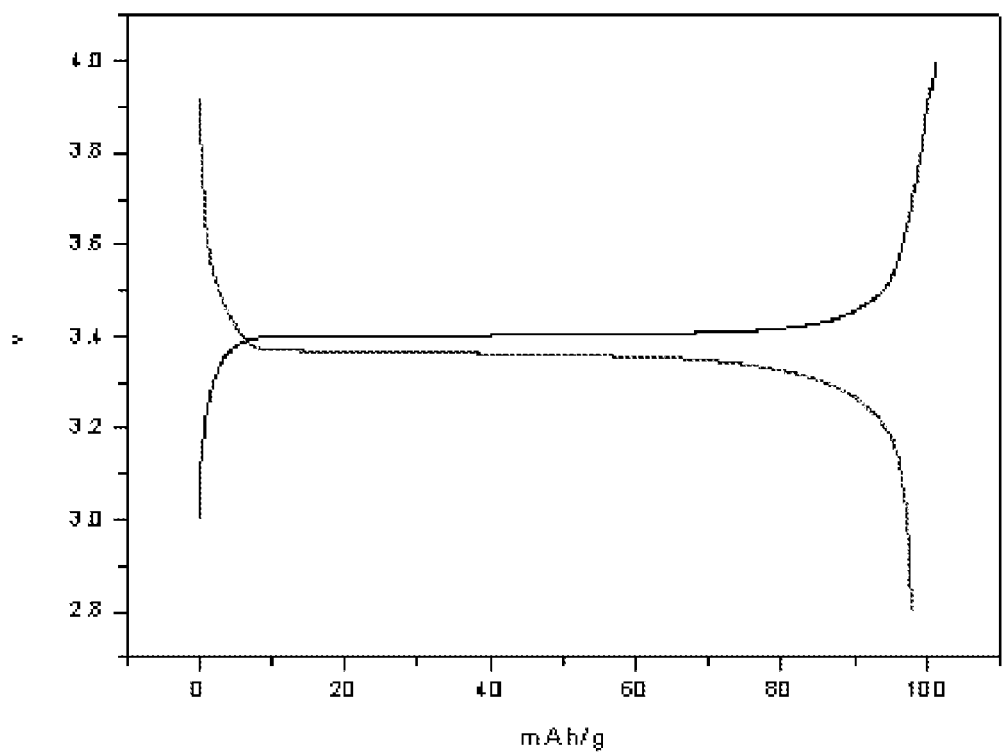
FIG. 4 is a graph of the first charge and discharge curve of the sample in Example 2 of the present invention.

The first charge and discharge curve of the sodium-ion battery (embodiment 22) comprising the cathode material for a sodium-ion battery of Example 12 was shown in FIG. 4. It can be seen from FIG. 4 that there was a voltage platform in the range of 2.8-4V, its value was about 3.4V. When the rate was 0.1 C, the initial charging capacity reached 110 mAh/g, which was close to the theoretical capacity of sodium vanadium phosphate.

The first charge and discharge curve of the sodium-ion battery (Example 23) comprising the cathode material for a sodium-ion battery of Example 13 was shown in FIG. 5. It can be seen from FIG. 5 that there was a voltage platform in the range of 2.8-4V, its value was about 3.4V. When the rate was 0.1 C, the initial charging capacity reached 110 mAh/g, which was close to the theoretical capacity of sodium vanadium phosphate.

The invention claimed is:

1. A method for preparing a cathode material for a sodium-ion battery, comprising the following steps:
   adding an initiator to a system of methyl allyl polyoxyethylene ether, N,N-dimethyl (methacryloxyethyl) ammonium propanesulfonate and acrylic acid, heating and reacting to obtain a solution of zwitterionic polymer;
   mixing the solution of zwitterionic polymer and a aqueous solution of sodium vanadium phosphate, and performing a drying process to obtain a precursor of the cathode material for the sodium-ion battery; and
   sintering the precursor of the cathode material for the sodium-ion battery to obtain the cathode material for the sodium-ion battery.

2. The method for preparing the cathode material for a sodium-ion battery of claim 1, wherein a method for preparing the aqueous solution of sodium vanadium phosphate comprises the following steps:
   preparing ammonium metavanadate, oxalic acid, ammonium dihydrogen phosphate and sodium acetate according to the molar ratio of sodium, vanadium and phosphorus at [2~1]: [1~3]: [4~2], wherein the mass ratio of oxalic acid to ammonium metavanadate is [2~1]: [2~1].

3. The method for preparing the cathode material for a sodium-ion battery of claim 1, wherein the initiator is any one of ammonium persulfate, potassium persulfate and hydrogen peroxide-ferrous sulfate.

4. The method for preparing the cathode material for a sodium-ion battery of claim 1, wherein methyl allyl polyoxyethylene ether, N,N-dimethyl (methacryloxyethyl) ammonium propanesulfonate and acrylic acid are in a mass ratio of 10-90:10-30:10-30.

5. The method for preparing the cathode material for a sodium-ion battery of claim 1, wherein the initiator has a mass fraction of 0.5%-1%.

6. The method for preparing the cathode material for a sodium-ion battery of claim 1, wherein the mass ratio of the zwitterionic polymer to sodium vanadium phosphate is 1-20:80-99.

7. The method for preparing the cathode material for a sodium-ion battery of claim 1, wherein the sintering treatment comprises the following steps:
   performing an initial sintering at a temperature of 300° C. to 400° C. for 5h, then performing a second sintering at a temperature of 700° C. to 800° C. for 8h, and the heating rate of the sintering is 3° C./min.

* * * * *